(12) United States Patent
Schmidt et al.

(10) Patent No.: US 8,578,571 B2
(45) Date of Patent: Nov. 12, 2013

(54) PLASTIC CLIP

(75) Inventors: Thomas Schmidt, Haverlah (DE); Johann Reindl, Biebertal (DE)

(73) Assignee: Newfrey LLC, Newark, DE (US)

( * ) Notice: Subject to any disclaimer, the term of this patent is extended or adjusted under 35 U.S.C. 154(b) by 0 days.

(21) Appl. No.: 13/021,366

(22) Filed: Feb. 4, 2011

(65) Prior Publication Data

US 2011/0154623 A1 Jun. 30, 2011

Related U.S. Application Data

(63) Continuation of application No. PCT/EP2009/005668, filed on Aug. 5, 2009.

(30) Foreign Application Priority Data

Aug. 7, 2008 (DE) .......................... 10 2008 038 871

(51) Int. Cl.
*F16B 2/20* (2006.01)

(52) U.S. Cl.
USPC .................................. 24/536; 24/542; 24/564

(58) Field of Classification Search
USPC ........... 24/530, 545–547, 555, 556, 560–564, 24/571, 570, 67.5, 456, 459, 502, 503, 24/505, 513, 515, 517, 535–537, 542
See application file for complete search history.

(56) References Cited

U.S. PATENT DOCUMENTS

| | | | | |
|---|---|---|---|---|
| 890,241 | A * | 6/1908 | Livingston | 24/532 |
| 2,250,469 | A * | 7/1941 | Crow | 24/536 |
| 3,137,027 | A * | 6/1964 | Birkle | 16/87.2 |
| 5,539,963 | A * | 7/1996 | Fujiwara et al. | 24/536 |
| 5,890,634 | A * | 4/1999 | Zuckerman et al. | 223/96 |
| 5,944,236 | A * | 8/1999 | Cinque | 223/1 |
| 6,170,197 | B1 * | 1/2001 | Tyves et al. | 49/375 |
| 6,343,409 | B1 * | 2/2002 | McAllister | 24/536 |
| 6,842,951 | B1 * | 1/2005 | Barre et al. | 24/499 |
| 2005/0257353 | A1 * | 11/2005 | Rohrig | 24/537 |

FOREIGN PATENT DOCUMENTS

| | | |
|---|---|---|
| AU | 3098384 A | 1/1985 |
| AU | 636689 B | 5/1993 |
| DE | 20219562 U | 4/2004 |
| DE | 202006002438 U | 5/2006 |
| FR | 2484034 A | 12/1981 |
| JP | 2005188697 A | 7/2005 |

* cited by examiner

*Primary Examiner* — James Brittain
(74) *Attorney, Agent, or Firm* — Michael P. Leary

(57) ABSTRACT

A plastic clip for fastening an article in the region of an end face of a flat workpiece comprises a base section, including a first and a second leg extending from the base section to form a U shape, and a fastening section connected to the base section and operable to fasten the article to the clip. The base section and the legs are made of a relatively hard plastic material and the legs can be elastically expanded relative to one another in order to accommodate the workpiece between their inner sides. An anti-slip section made of a relatively soft plastic material is provided on at least one of the inner sides.

11 Claims, 5 Drawing Sheets

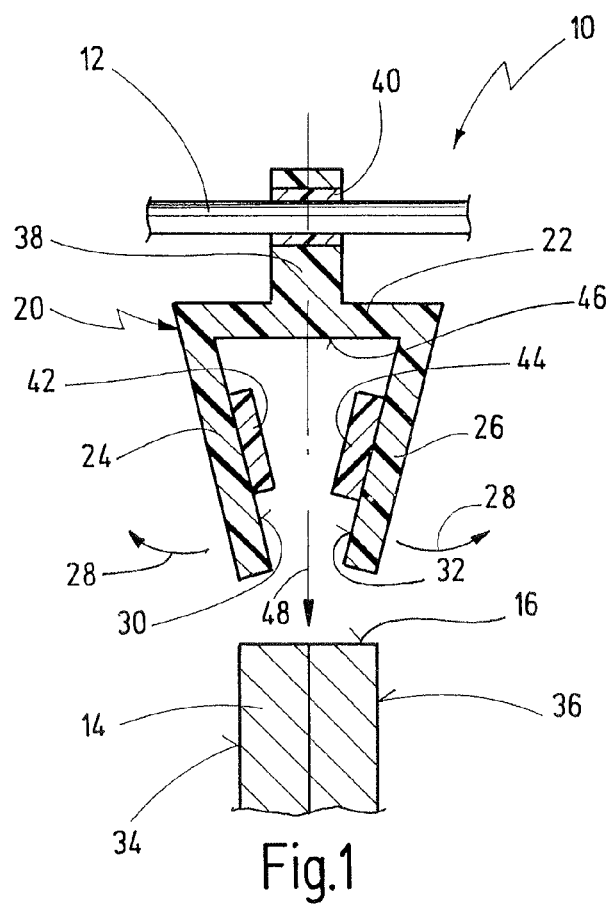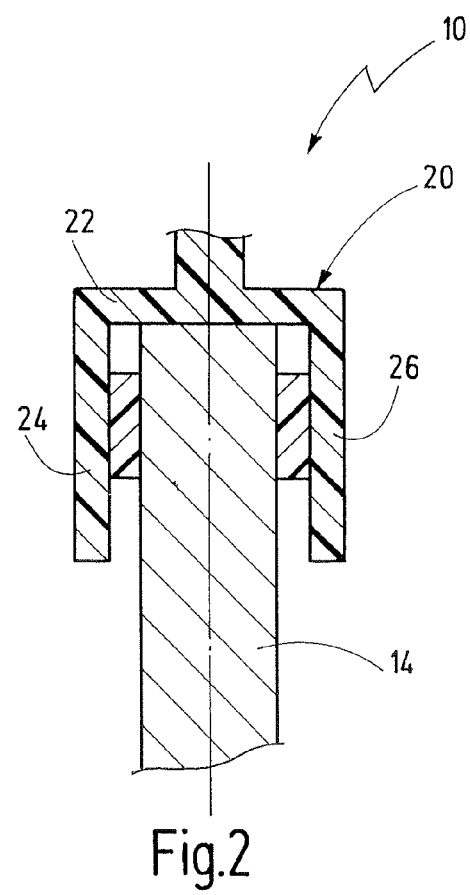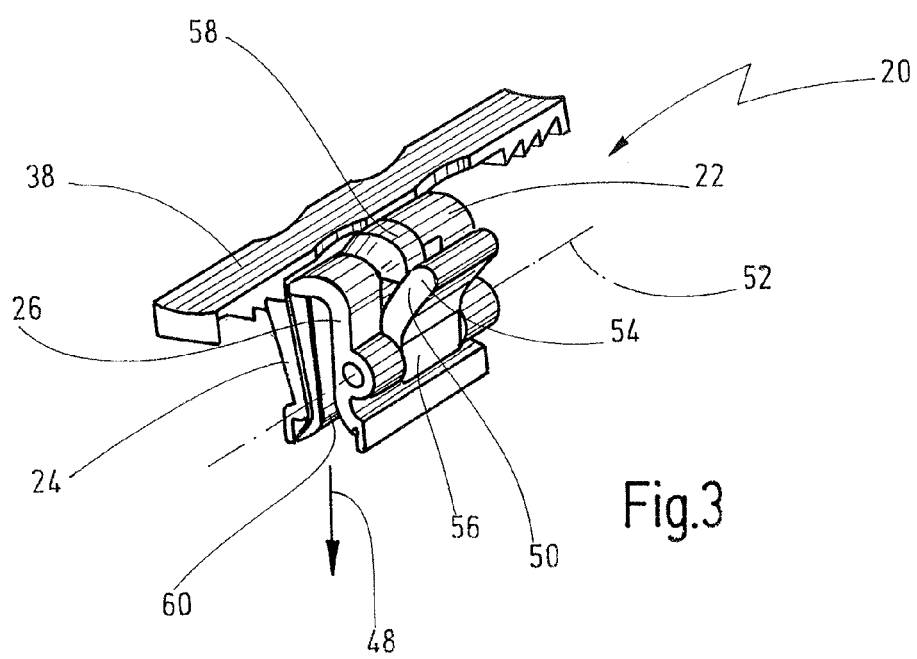

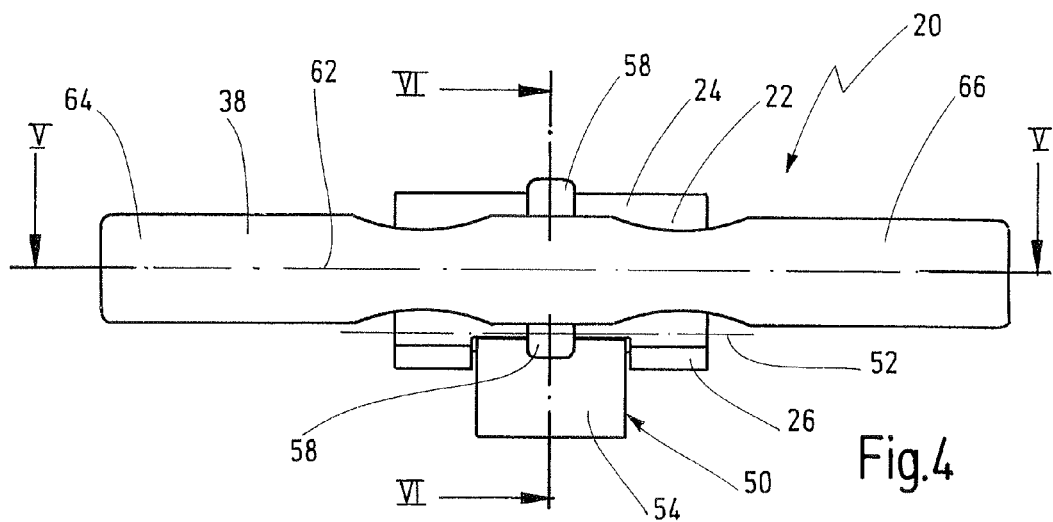
Fig.4
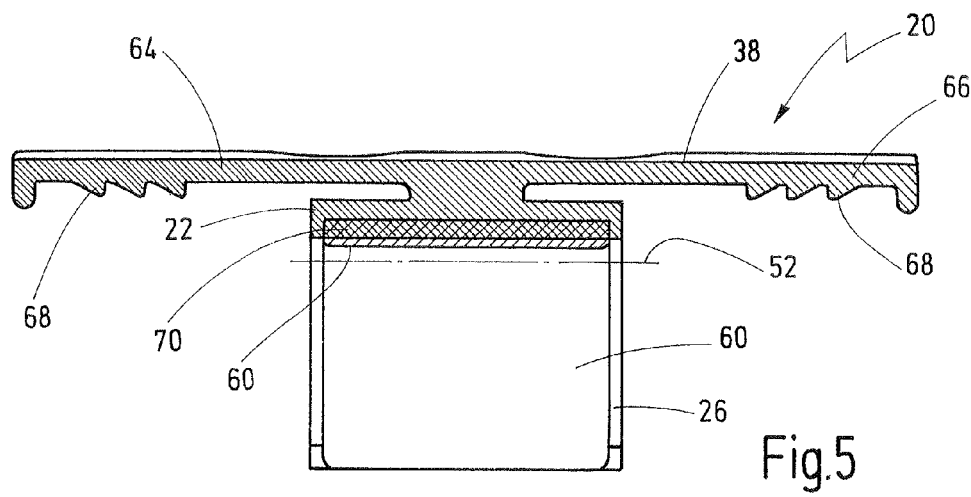
Fig.5
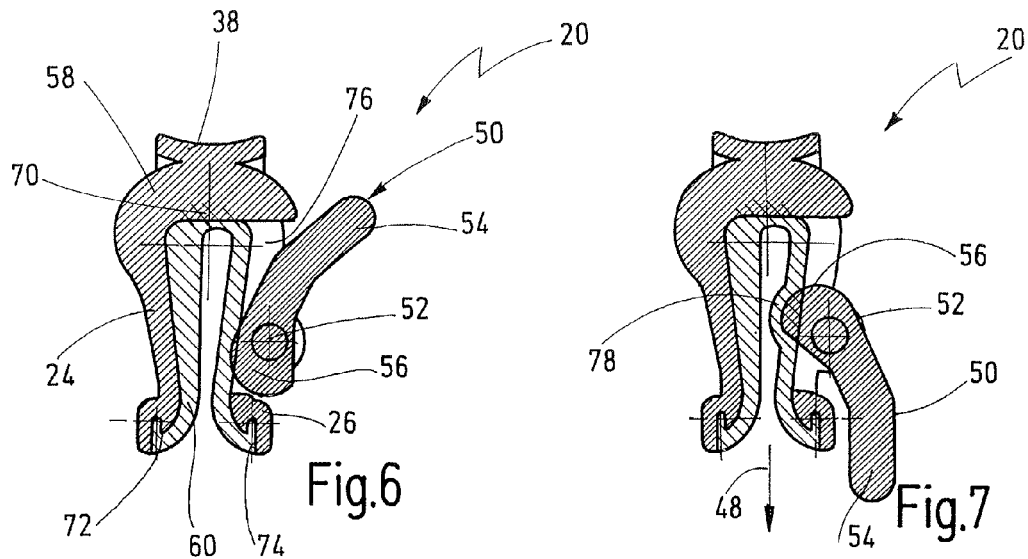
Fig.6
Fig.7

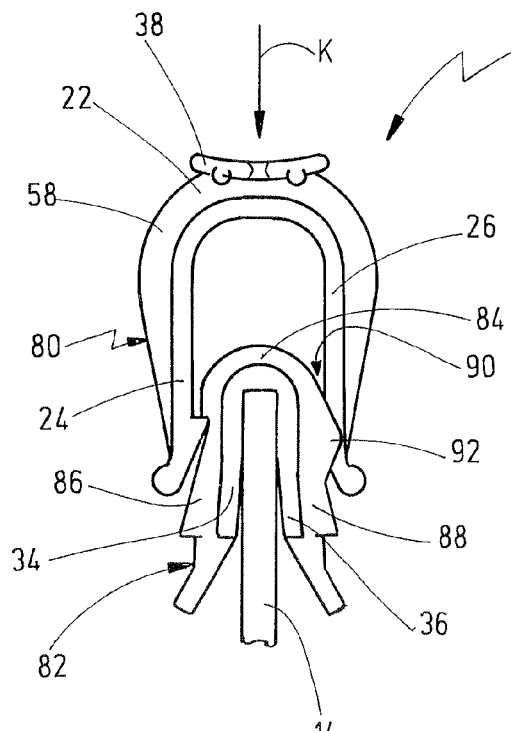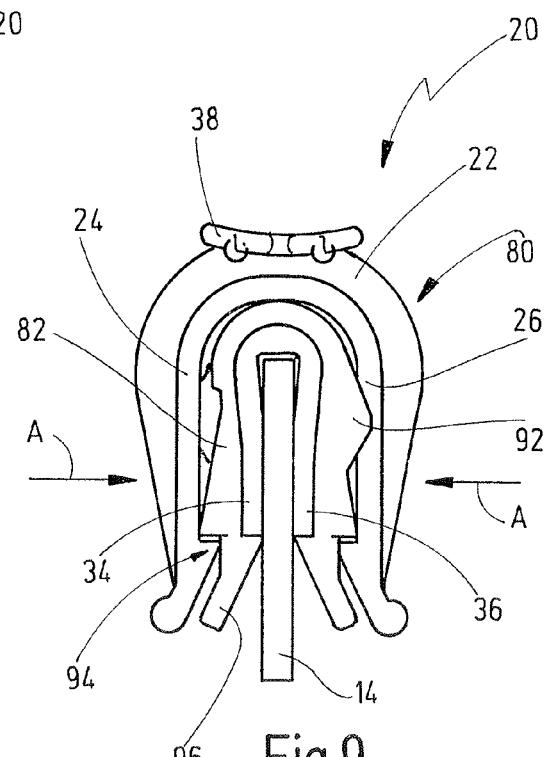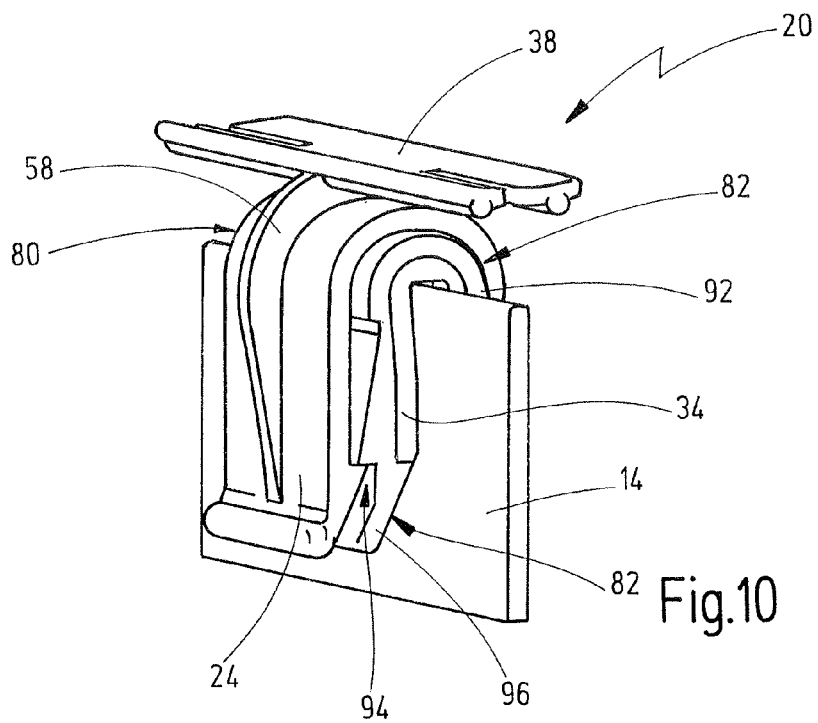

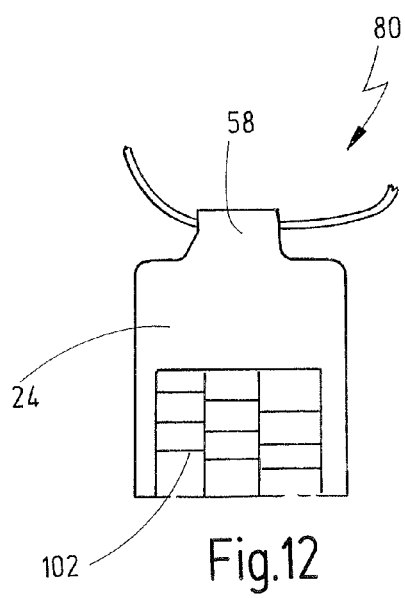
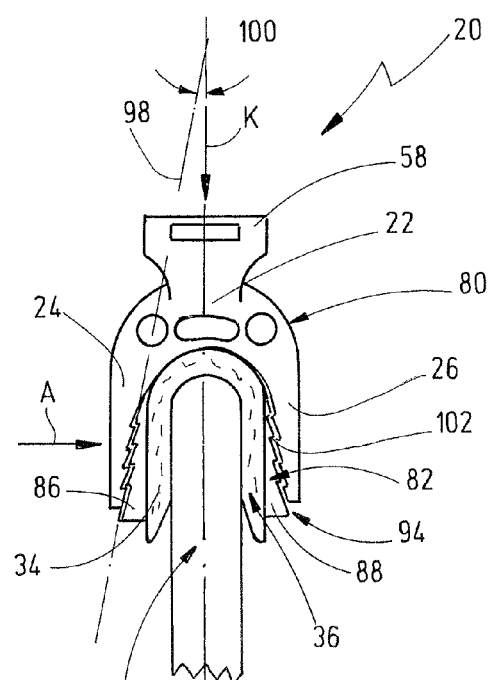
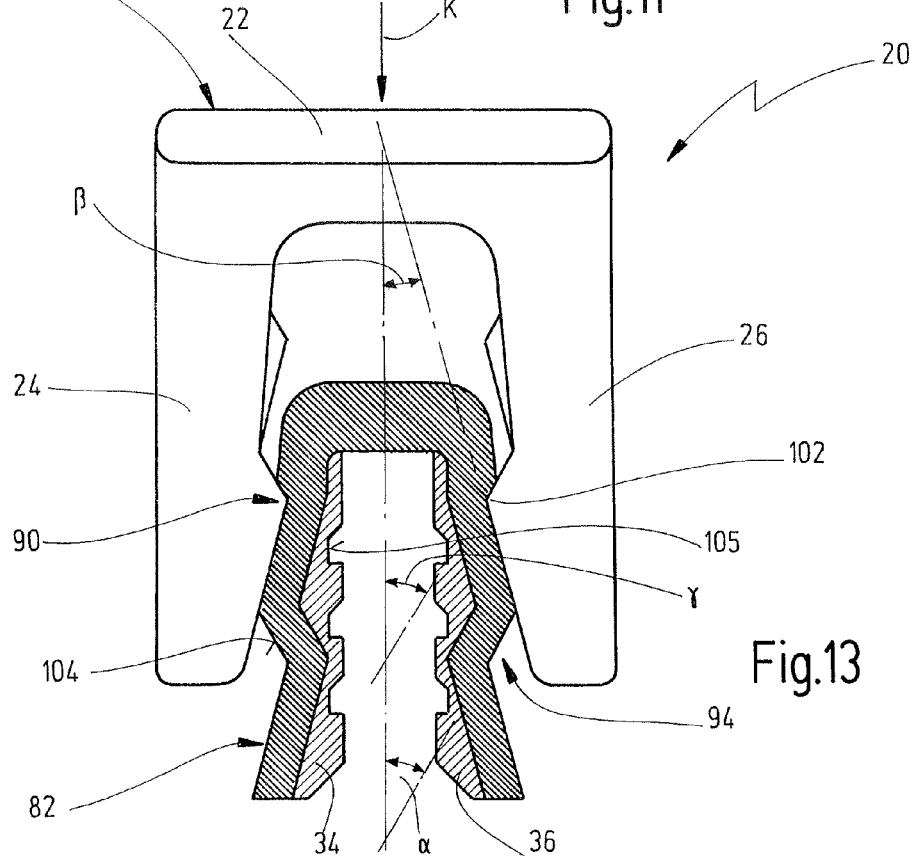

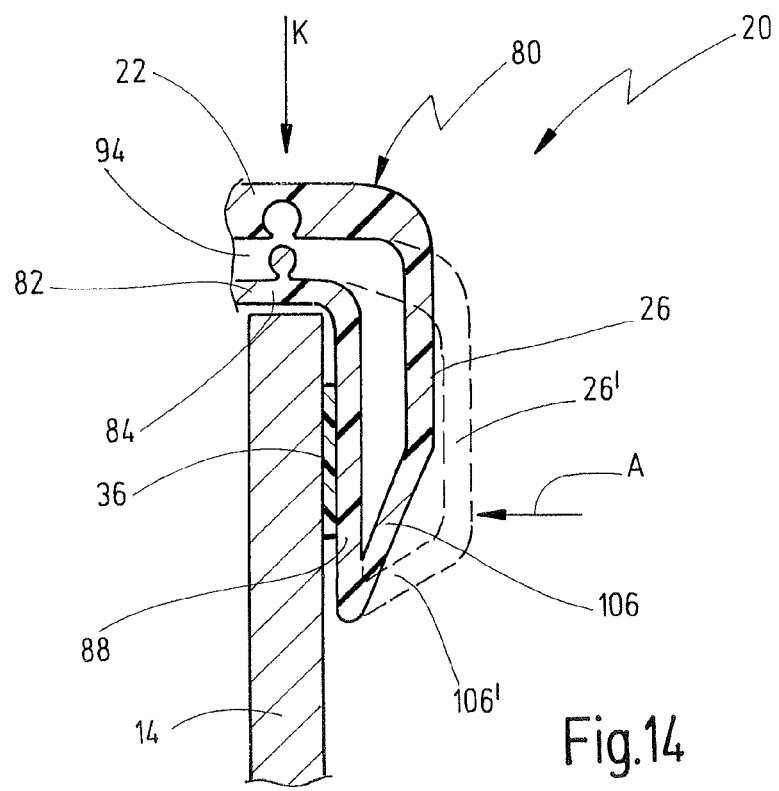
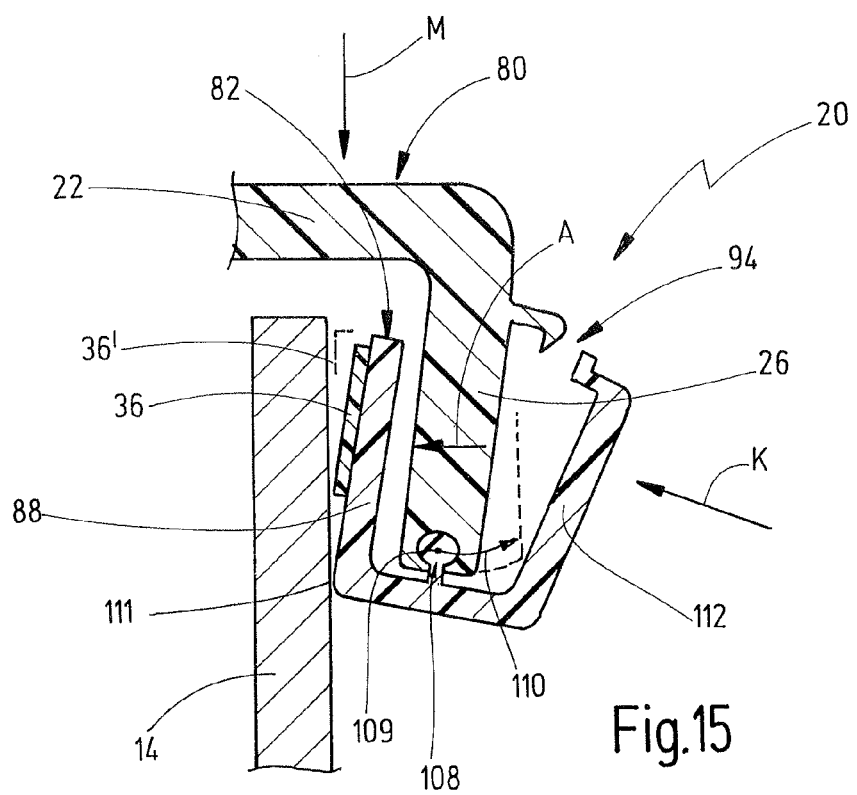

PLASTIC CLIP

CROSS REFERENCE TO RELATED APPLICATIONS

This application is a continuation of PCT Application No. PCT/EP2009/005668, filed Aug. 5, 2009 which claims the benefit of German Application No. 102008038871.8 filed Aug. 7, 2008, the disclosure of which is incorporated herein by reference.

BACKGROUND OF THE INVENTION

The present invention relates to a plastic clip for fastening an article in the region of an end face of a flat workpiece, comprising a base section whose shape is adapted to the end face, comprising a first and a second leg which extend from the base section and form a U shape with the base section, and comprising a fastening section which is connected to the base section and is designed to fasten the article to the clip, wherein the legs can be elastically expanded relative to one another.

Such plastic clips for the secure fastening of lines (pipes, electrical lines, Bowden cables, etc.) or cable sets, plugs, sensors, etc., to end faces or edges of workpieces are known, wherein the plastic clips comprise an integrated metal cramp. The workpieces may in this case be of slippery design in the region of the end face, as is the case, for example, with body sheets, plastic edges of bumpers, covers, wheel arch shells and glass workpieces. These plastic clips are preferably used in the region of dashboards of motor vehicles, of water tanks as well as in the interior region (e.g. in the areas of doors), in the exterior region and in the motor compartment of motor vehicles.

The metal cramps of the known plastic clips have a metal spring claw which digs in firmly on the surface of the workpiece when the plastic clip is fastened. This type of fastening firstly has the disadvantage that the surface of the workpiece may be damaged (e.g. in the case of galvanized or enamelled sheet-metal edges). This may already be done by the metal spring claw when pressing on or opening the plastic clip. This may result in corrosion problems. In addition, these known plastic clips have the disadvantage that they can only be detached in a relatively complicated manner. In the process, it is partly necessary to destroy the plastic clip. This is a comparatively expensive fastening solution overall.

BRIEF DESCRIPTION OF THE INVENTION

Against this background, it is the object of the invention to specify a clip for fastening the article in the region of an end face of a flat workpiece, which clip does not damage the surface of the workpiece and can be attached and, if applicable, detached relatively easily. Nonetheless, it is to be possible to realize a secure hold of the clip on the workpiece, and the clip is made preferably only from plastic material.

This object is, according to a first aspect of the invention, achieved by a plastic clip having the features of claim 1.

In this case, the base section and the legs are made in one piece of a first, relatively hard plastic material. An anti-slip section made of a relatively soft plastic material is provided on at least one of the inner sides of the legs.

The anti-slip section firstly enables the plastic clip to be securely fixed to the workpiece. Secondly, the anti-slip section can ensure that the surface of the workpiece is not damaged. Finally, such a plastic clip can be detached relatively easily, as a rule without the need to destroy the plastic clip.

Due to the high coefficient of friction of the relatively soft plastic material, which is preferably a thermoplastic elastomer (TPE), unintentional removal of the plastic clip from the end face region of the workpiece can be prevented and therefore a tight fit of the article to be fastened can be ensured.

The object is therefore completely achieved.

According to a particularly preferred embodiment, the base section and the legs are manufactured integrally from a first, relatively hard plastic material.

This allows to manufacture the plastic clip with few elements or components.

It is especially advantageous in this case if an anti-slip section is provided on the inner sides of both legs.

This improves the reliability of the fastening of the plastic clip on the workpiece.

Furthermore, it is advantageous if an anti-slip section is likewise provided on the bottom side, facing the legs, of the base section.

This can also increase the reliability of the fastening, since relatively high friction can also be set up between the end face of the workpiece and the anti-slip section on the bottom side of the base section.

The plastic clip described above can generally be sufficient in order to realize a secure fit on the end face of the workpiece.

It is especially preferred, however, if a lever is rotatably mounted on at least one of the legs, said lever being pivotable between a clamping position and a release position and having a clamping section which extends into a region between the legs in the clamping position and is pulled back from the region between the legs in the release position.

Consequently, the plastic clip having the lever can be fitted on the workpiece relatively easily in the release position. The prestress of the elastically expandable legs is then increased further by pivoting the lever into the clamping position. As a result, the fit of the plastic clip on the workpiece can again be improved.

In this case, it is especially advantageous if the leg on which the lever is rotatably mounted has an aperture through which the clamping section can extend into the region between the legs.

Here, the clamping section can be supported approximately symmetrically on the associated leg in order to set up the clamping position. As a result, the correct fit of the plastic clip on the workpiece can be further improved.

Furthermore, it is advantageous in this case if the anti-slip section covers the aperture on the inner side of the leg, such that the clamping section can press the anti-slip section against the workpiece in the clamping position.

In this embodiment, the lever, in the clamping position, can advantageously increase the friction between the anti-slip section and the surface of the workpiece.

In general, in the embodiments having a lever which is rotatably mounted on one of the legs, the plastic clip can also be detached again relatively easily. This can be done by the lever being pivoted from the clamping position back into the release position. As a result, the fit between the clamping clip and the workpiece is slackened, such that the plastic clip can then be removed relatively easily from the workpiece, in particular without destroying the plastic clip.

Repeated fitting and detachment are also possible.

It is especially preferred if the lever is rotatably mounted about a rotation axis which is oriented parallel to the associated leg.

In this way, the rotation axis can be set up on the leg in a comparatively simple manner in terms of design, in particular from injection moulding aspects.

Furthermore, it is advantageous if the rotation axis is oriented transversely to a longitudinal direction in which the legs extend from the base section.

In this embodiment, the lever can consequently be actuated essentially in the longitudinal direction, such that a relatively compact outer contour of the plastic clip is obtained, at least in the clamping position. In other words, disturbing contours, which could represent a risk of unintentional release of the plastic clip, can largely be avoided.

Generally, it is preferred if the anti-slip section is arranged directly at the inner side of the legs.

According to an alternative embodiment, the plastic clip comprises an outer portion which forms the base section and the legs, and an inner portion which is also made of a relatively hard plastic material, wherein the anti-slip section is arranged at the inner side of a leg of the inner portion.

The plastic material of the inner portion can be identical with the plastic material of the outer portion, but may be also a different plastic material.

The inner portion, in a most simple embodiment, may form also a U-shape with an inner base section and inner legs which are encompassed by the legs of the outer portion. However, the inner portion may consist only of legs which are formed as carriers for the anti-slip sections. In this case, the inner legs which are not coupled to each other, can for example in a release condition be coupled to respective legs of the outer portion.

The outer portion and the inner portion may perform different functions in this embodiment, as is described in the following for several different embodiments.

For example, it is preferred if the outer portion is moveable with respect to the inner portion in a clamping direction so as to bring the plastic clip from a release condition to a clamping condition in which the outer portion exerts a pressure force on the inner portion from the outside in a direction toward the workpiece.

In this embodiment, the outer portion and the inner portion have such relative positions in the release condition, so that pushing the plastic clip onto the workpiece is comparatively easy, wherein the respective anti-slip section essentially has no increased friction effect with respect to a surface of the workpiece. Thus, the plastic clip can be mounted with low mounting forces.

After the relative movement and in the clamping condition, the outer portion exerts a pressure force on the inner portion in a direction toward the workpiece. Conclusively, the friction value between the anti-slip section and the surface of the workpiece is increased. Thus, the pull-off force is increased which is necessary to move the plastic clip off the workpiece. This increases the mounting reliability.

It is particularly preferred here if the clamping direction extends essentially parallel to the extension of the legs.

Here, the clamping direction can be aligned transversely to a direction in which the inner portion is pushed on the workpiece. However, it is particularly preferred if the clamping direction is aligned in parallel to such mounting direction. In this embodiment, the mounting is performed generally such that, in a first step, the inner portion is pushed in the mounting direction onto the end face of the workpiece. Subsequently, the outer portion is moved in the same direction relatively to the inner portion, in order to establish the clamping condition.

Here, it is also preferred if a locking device is provided which locks, in the clamping condition, the outer portion to the inner portion.

Generally, the locking device can be formed by an additional element.

It is particularly preferred, however, if the locking device is formed as a latching device.

In this embodiment, the locking can be achieved by a latching engagement between the outer portion and the inner portion. The latching device can include a latching nose or a plurality of latching noses, either at one or at both legs of the outer portion and/or the inner portion.

According to a further preferred embodiment, the latching device comprises a latching nose or a plurality of latching noses that are arranged one after another in the clamping direction.

Here, the outer portion can be fastened in different relative positions to the inner portion.

It is further preferred here if the latching noses are arranged along a cone line which is arranged at an angle of greater than zero with respect to the clamping direction.

In this embodiment, it is possible to use the plastic clip for mounting to workpieces of different thickness. When using very thin workpieces, the outer portion is pushed relatively far with respect to the inner portion, so that the legs of the inner portion are pushed together relatively far due to the cone effect. When using thicker workpieces, the extent of the relative movement can be smaller.

Further, the pressure force can be adjusted by the cone arrangement of the latching portion.

Generally, it is possible to produce the outer portion and the inner portion as separate elements which are locked against each other not until the clamping condition is established.

It is particularly preferred, however, if the outer portion and the inner portion are coupled to each other by a coupling device before the plastic clip is brought into the clamping condition.

It is possible here to store and handle the plastic clip including the outer portion and the inner portion as a pre-mounted assembly.

For example, it is possible to form the coupling device by an integral hinge which couples the outer portion and the inner portion to each other in the premounting position (release condition). In this case, the integral hinge is broken when transferring the plastic clip into the clamping condition.

It is particularly preferred, however, if the outer portion and the inner portion are latched against each other in the premounting position, i.e. in the release condition.

Here, the outer portion and the inner portion can be manufactured separately from each other, particularly made of different materials. The inner portion can be produced together with the anti-slip section in a two-component injection moulding process. The coupling in the pre-mounting condition is made by latching the outer portion to the inner portion.

It is further preferred if a leg of the outer portion and a leg of the inner portion are connected to each other by a parallelogram displacement section.

The parallelogram displacement section may connect respective ends of the legs of the outer portion and the inner portion to each other, such that in a pre-mounting position the parallelogram displacement section is aligned obliquely with respect to the extension of the legs. If the outer portion is, subsequently, moved relative to the inner portion in the clamping direction, this leads to an "erection" of the parallelogram displacement section, whereby the legs of the outer portion and the legs of the inner portion are expanded against each other in a direction transverse to the clamping direction. It is possible here that the outer portion exerts an increased pressure force to the inner portion in the clamping condition, i.e. by means of the parallelogram displacement section.

It is further preferred if the inner portion is supported by the outer portion so as to be pivotable about a pivot axis.

In this embodiment, the pivot axis may for example be arranged in the area of a free end of a leg of the outer portion. Preferably, the pivot axis extends in a direction in parallel to the extension of the legs, but transverse to the clamping direction. It is possible in this embodiment to increase a pressure force of the inner portion on the workpiece by pivoting the inner portion about the pivot axis.

Furthermore, it is advantageous overall if the plastic clip comprising the base section and the legs made of the relatively hard plastic material and the anti-slip section made of relatively soft plastic material is produced by a two-component injection moulding process.

In this embodiment, the plastic clip is formed in one piece with the anti-slip section and can consequently be easily handled and stored.

Furthermore, cost-effective production results.

If the plastic clip comprises an outer portion and an inner portion, it is to be understood that the anti-slip section can be produced by the two-component injection moulding process at least together with the inner portion. In some embodiments, the inner portion and the outer portion may integrally coupled to each other (e.g. coupled by an integral hinge). In other embodiments, the inner portion and the outer portion can be produced from different components.

In this case, the expression "two-component injection moulding process" preferably refers to the fact that the plastic clip is produced in a single tool, wherein the relatively hard plastic material for forming the base section and the legs is injected in a first processing step. In a second step, using the same tool closure, the second plastic material is injected in order to form the anti-slip section.

According to a further embodiment preferred overall, the fastening section is formed in one piece with the base section and the legs from the relatively hard plastic material.

As a result, the fastening section can be integrated in one piece in the plastic clip.

Furthermore, it is advantageous if a damping section which is made of a relatively soft plastic material and to which the article can be fastened is formed on the fastening section.

The same relatively soft plastic material as for forming the anti-slip section can be used in this embodiment. Furthermore, the damping section can preferably be produced in one operation with the anti-slip section, preferably by the two-component injection moulding process described above.

In this way, vibrations of the article on the plastic clip or vice versa can be damped.

Furthermore, it is advantageous if at least one reinforcing rib extending radially outwards is formed on the outer side of the legs and/or of the base section.

In this embodiment, the strength of the plastic clip can be increased. For example, the elasticity with which the legs can bend relative to the base section can be reduced by the reinforcing rib. Furthermore, the reinforcing rib can also serve to fasten the fastening section to the base section more sturdily or over a larger area.

On the whole, depending on the embodiment, the plastic clip can be used with workpieces of different thickness. Furthermore, the plastic clip can preferably be fitted and detached without an auxiliary tool, wherein in the embodiment having a lever, the lever can be actuated by hand.

According to a second aspect of the present invention, the plastic clip does not comprise an anti-slip section. The above-described different embodiments can, according to this aspect of the invention, be realized without such anti-slip section, particularly, if the relative hard material of the plastic clips is capable to establish a relatively high friction effect with respect to the surface of the workpiece.

It is in each of the above-described embodiment generally also possible to integrally injection mold a metal element into the plastic clip instead of providing the anti-slip section of the relatively soft plastic material or to injection mold the plastic clip around such metal element or to complete the plastic clip with a metal element which is formed as a "spring claw" and which is adapted to dig in firmly on the surface of the workpiece.

It goes without saying that that the abovementioned features and the features still to be explained below can be used not only in the respectively specified combination but rather also in other combinations or on their own without departing from the scope of the present invention.

BRIEF DESCRIPTION OF THE SEVERAL VIEWS OF THE DRAWINGS

Exemplary embodiments of the invention are shown in the drawing and described in more detail below. In the drawing:

FIG. 1 shows a schematic cross-sectional view of a plastic clip according to a first embodiment before the fastening to a workpiece;

FIG. 2 shows the plastic clip of FIG. 1 fastened to a workpiece;

FIG. 3 shows a perspective view of a further embodiment of a plastic clip according to the invention;

FIG. 4 shows a plan view of the plastic clip in FIG. 3;

FIG. 5 shows a cross-sectional view along line V-V of FIG. 4;

FIG. 6 shows a cross-sectional view along line VI-VI in FIG. 4 with a lever in a release position;

FIG. 7 shows an illustration corresponding to FIG. 6 with the lever in a clamping position;

FIG. 8 shows a schematic cross-sectional view of a plastic clip according to a further embodiment in a release condition;

FIG. 9 shows the plastic clip of FIG. 8 in a clamping condition;

FIG. 10 shows a perspective view of the plastic clip of FIGS. 8 and 9 in the clamping condition;

FIG. 11 shows a schematic cross-sectional view of a further embodiment of a plastic clip in a clamping condition;

FIG. 12 shows a schematic view of a leg of an outer portion of the plastic clip of FIG. 11 from the inside;

FIG. 13 shows a schematic cross-sectional view of a further embodiment of a plastic clip in a release condition;

FIG. 14 shows a schematic cross-sectional view of a further embodiment of a plastic clip in a release condition; and FIG. 15 shows a schematic cross-sectional view of a further embodiment of a plastic clip in a release condition.

DETAILED DESCRIPTION OF THE PREFERRED EMBODIMENT

A fastening arrangement is generally designated by 10 in FIG. 1.

The fastening arrangement serves to secure an article 12 to the end face 16 of a flat workpiece, such as a metal sheet, a glass pane, a plastic edge, etc. The article 12 may be in particular an elongated article, such as a conduit, a pipe or a Bowden cable, but may also be a cable harness, a plug, a sensor, etc. The elongated article 12 is preferably fastened parallel to the end face 16 of the workpiece 14, but is shown in FIG. 1 in an orientation which extends transversely to the end face or to the workpiece 14.

A plastic clip 20 serves to fasten the article 12 to the workpiece 14.

The plastic clip 20 has a base section 22, the shape of which is adapted to the end face 16 of the workpiece 14. Extending from the base section 22 are a first leg 24 and a second leg 26, which together with the base part 22 form a U shape and can be expanded in a direction away from one another, as shown at 28.

The first leg 24 has a first inner side 30. The second leg 26 has a second inner side 32. The distance between the legs 24, 26 is selected in such a way that the flat workpiece 14 can be accommodated in between when the legs 24, 26 are expanded relative to one another. In the process, the inner sides 30, 32 come to bear against a first outer side 34 and respectively a second outer side 36 of the workpiece 14 or are oriented parallel to one another.

Furthermore, the plastic clip 20 has a fastening section 38 for the article 12. The fastening section 38 extends from the base section 22, preferably in a direction opposed to the direction of the extent of the legs 24, 26.

The fastening section 38 may be designed as a mere supporting surface on which an article can be placed and then fastened by aids such as cable ties or the like. However, the fastening section 38 may also contain a lid section which is mounted on the fastening section 38 or the base section 22 in an articulated manner. In this case, the article 12 can be accommodated in an open position of the lid and can be securely held in the fastening section 38 in a closed position of the lid.

To reduce vibrations which can be transmitted between the article 12 and the plastic clip 20 or vice versa, a damping section, via which the article 12 is mounted on the plastic clip 20, may be provided on the fastening section 38.

The base section 22, the legs 24, 26 and the fastening section 38 are preferably made of a relatively hard plastic material and are connected in one piece to one another. However, the relatively hard plastic material is still elastically deformable to a limited extent in order to permit the expandability of the legs 24, 26. Alternatively, the expandability can also be formed by a suitable configuration of the base section 22 and of the legs 24, 26 or of the transition therebetween.

The damping section 40 is made of a relatively soft plastic material, such as TPE, and is elastically deformable to a relatively pronounced extend or has great elasticity.

A first anti-slip section 42 and a second anti-slip section 44, respectively, made of a relatively soft plastic material (such as TPE) are formed on the inner sides 30, 32 of the legs 24, 26. The bottom side 46, facing the legs 24, 26, of the base section 22 has no anti-slip section, but may alternatively be provided with one.

The plastic clip 20 is put onto the workpiece 14 in an insertion direction 48 (longitudinal direction), the legs 24, 26 being expanded beforehand. The fastening of the plastic clip 20 is preferably effected until the bottom side 46 bears on the end face 16. This state is shown in FIG. 2. In this case, the anti-slip sections 42, 44 bear against the outer sides 34, 36 of the workpiece. On account of the elastic restoring forces of the legs 24, 26 (against the expansion direction 28), the legs 24, 26 are pressed firmly against the outer sides 34, 36. Due to the high coefficient of friction of the anti-slip sections 42, 44, slipping or unintentional removal of the plastic clip 20 from the workpiece 14 can be prevented and a tight fit of the article 12 to be fastened can therefore be ensured.

The plastic clip 20 can be detached by the legs 24, 26 being expanded in expansion direction 28 and by the plastic clip then being removed from the workpiece 14 against the insertion direction 48.

A further embodiment of a plastic clip 20 according to the invention is shown in FIGS. 3 to 7. The plastic clip 20 of FIGS. 3 to 7 corresponds in construction and functioning to the plastic clip 20 of FIGS. 1 and 2. The same elements are therefore provided with the same reference numerals. The differences between the embodiments are essentially explained below.

As can be seen in particular in FIG. 3 and in FIGS. 6 and 7, the plastic clip 20 has a lever 50 which is mounted on one of the legs (the leg 26) such as to be pivotable about a rotation axis 52. The rotation axis 52 is in this case arranged approximately parallel to the surface extent of the leg 26 and extends in a direction transverse to the insertion direction 48. The lever 50 has an actuating section 54 which extends outwards from the rotation axis 52. Furthermore, the lever 50 has a clamping section 56 which may be designed, for example, as an eccentricity section and is arranged on the opposite side of the rotation axis 52.

The lever 50 is shown in a release position in FIGS. 3 and 6. In this release position, the actuating section 54 extends obliquely upwards against the insertion direction 48. The clamping section 56 is in this case aligned approximately with the inner side 32 of the leg 26. The lever 50 can be shifted from this release position into a clamping position, in which the actuating section 54 extends downwards in the insertion direction 48, as shown in FIG. 7. In this clamping position, the eccentric clamping section 56 extends inwards into the space between the legs 24, 26.

Formed on the top side of the base section 22 is a reinforcing rib 58 which extends radially outwards relative to the base section 22 and is preferably connected at least in sections to the fastening section 38. The reinforcing rib 58 consequently serves to support the fastening section 38 more effectively. Furthermore, the reinforcing rib 58 may also function in such a way as to set the expandability of the legs 24, 26, in particular in such a way as to provide for slight elasticity. In other words, the reinforcing rib 58 can achieve the effect that the restoring force exerted by the legs 24, 26 against the expansion direction 28 can be increased. The reinforcing rib 58 may in this case also extend at least partly along the outer side of the legs 24, 26, as can be seen in particular in FIGS. 4 and 6. Furthermore, instead of an individual reinforcing rib 58, a plurality of such reinforcing ribs 58 may also be provided.

An anti-slip section 60 made of a relatively soft plastic material is formed on the inner side of the plastic clip 20 between the legs 24 and 26. The anti-slip section 60 extends essentially over the two inner sides 30, 32 of the legs 24, 26 and also on the bottom side 46 of the base section 22 and consequently likewise has a U shape overall, as can be seen in particular in FIGS. 6 and 7.

As can be seen in FIG. 4, the fastening section 38 is designed to fasten an article 12 in a direction parallel to the extent of the end face 16 of the workpiece 14, to be precise along a fastening axis 62 which preferably runs parallel to the rotation axis 52 of the lever.

The fastening section 38 has a first wing 64 which extends from the base section 22 in one direction along the fastening axis 62. Furthermore, the fastening section 38 has a second wing 66 which extends from the base section 22 in the opposite direction. Consequently a large supporting surface overall can be provided for an elongated article.

Ribs 68 may be provided on the underside of the wings 64, 66, as shown in FIG. 5. The ribs 68 can serve to fix fastening means such as cable ties or the like in the axial direction.

The plastic clip 20 is produced by a two-component injection moulding process. In this case, the base section 22, the legs 24, 26 and the fastening section 38 form a first component which is made of a relatively hard plastic material and is injection moulded in a first step. The anti-slip section 60 forms a second component made of a relatively soft plastic material and is preferably injection moulded in a second step. In this case, the anti-slip section 60 is connected to the relatively hard plastic material firstly in the region of a first connecting section 70 which is arranged in the region of the bottom side 46 of the base section 22. Furthermore, the anti-slip section 60 is connected to the free ends of the legs 24, 26, to be precise at a second connecting section 72 and at a third connecting section 74, respectively, as can be seen in particular in FIG. 6.

The second leg 26 has an aperture 76 in which the lever 50 is arranged, the actuating section 54 extending out of the aperture 76. The anti-slip section 60 covers the aperture 76 on the inner side of the second leg 26 in such a way that the clamping section 56 bears against the anti-slip section 60 from outside.

As viewed in the direction of the rotation axis 52, the pivot bearings for pivoting the lever 50 about the rotation axis 52 may be arranged on opposite sides of the aperture 76, as shown in FIG. 3.

The plastic clip 20 is put onto the workpiece 14 in a state in which the lever 50 is located in the release position (FIG. 6). In the process, the legs 24, 26 are expanded relative to one another and the plastic clip 20 is put onto the workpiece 14 until the end face 16 bears against the anti-slip section 60 arranged in the region of the bottom side 46. A relatively secure fit of the plastic clip 20 on the workpiece 14 is thereby already ensured by the restoring force of the elastically expanded legs 24, 26.

The strength of the fit can now be markedly increased again by the lever 50 being pivoted into the clamping position shown in FIG. 7. In the process, the clamping section 56 presses from outside against the anti-slip section 60 and presses the latter against the outer side 36 of the workpiece 14, to be precise in the region of a pressure section 78, which is shown in FIG. 7.

The shape of the lever 50 is selected in such a way that the actuating section 54 extends approximately parallel to the outer side 36 of the workpiece 14 in the clamping position and consequently forms only a slight disturbing contour. Furthermore, the clamping section 56 is designed in such a way that the lever 50 is briefly subjected to additional pressure on the way between the release position and the clamping position, thereby resulting in a secure position of the lever 50 in the clamping position; that is to say, the lever 50 cannot become released again unintentionally into the release position.

It can be seen in this case that the pressure section 78 is displaced relative to the rotation axis 52 against the insertion direction 48.

The above-described embodiments comprise a base section and two legs extending from the base section, wherein anti-slip sections are preferably formed at the inner circumference of the legs. In the following, further embodiments of inventive plastic clips are described which each comprise an outer portion and an inner portion. Here, the outer portion, generally, comprises also a base and two legs extending therefrom, wherein the outer portion is made from a relatively hard plastic material. Further, the following embodiments are characterized in that the inner portion is generally formed to lie against the opposing side surfaces of the workpiece. Here, a respective anti-slip section is preferably provided at the inner portion. Further, the following embodiments are characterized in that the outer portion is moveable relative to the inner portion between a release position and a clamping position. In the release position, the plastic clip can be placed onto the workpiece with little force or without effort. In the clamping position, the outer portion urges the inner portion so that an increased friction force is established between the inner portion or the anti-slip section and the workpiece. Hereby, the pull-off force is increased. The inner portion is preferably produced also from a relatively hard plastic material, wherein this material can be the same or a plastic material different from the plastic material of the outer portion. For example, the outer portion can be produced from PA 66 GF, and the inner portion from PP.

In the embodiments described in the following, the outer portion is generally locked with respect to the inner portion in the clamping position, preferably by a latching device. The latching device can, generally, be formed such that releasing the latching connection is possible only with the use of a tool. As an alternative, the latching connection can be formed such that releasing the latching condition is possible by applying an increased effort of force in a direction counter to the clamping direction without using a tool.

In the following embodiments, the fastening section for fastening an article is in many cases not depicted separately. The fastening section is, however, preferably formed integrally with the outer portion, even if this is not depicted in each case.

In the description of the following embodiments it is to be noted that the general layout and the general function correspond to those of FIGS. 1 and 2. Identical elements are therefore given the same reference numerals. In the following, essentially the differences to FIGS. 1 and 2 are explained.

In FIGS. 8 to 10 a first embodiment of a plastic clip 20 is shown which comprises an outer portion 80 and an inner portion 82. The inner portion 82 forms a U-shape and comprises a base section 84 as well as two legs 86, 88 extending therefrom, which are adapted to encompass the workpiece 14. At each of the inner sides of the legs 86, 88, an anti-slip section 34, 36 is provided. The outer portion 80 of the plastic clip 20 comprises also a base section 22 and two legs 24, 26 extending therefrom. The outer portion 80 and the inner portion 82 are shown in FIG. 8 in a release position in which the plastic clip can be easily and essentially without force be placed onto the workpiece 14. Here, the outer portion 80 is coupled to the inner portion 82 by means of a first latching device 90 so that the inner portion 82 and the outer portion 80 are held undetachably against each other. To this purpose, the legs 24, 26 of the outer portion 80 comprise inner latching noses at the ends thereof which engage into corresponding latching recesses at the outer side of the inner portion 82. The latching recesses of the inner portion are formed in a transition area between the legs 86, 88 and the base section 84. Starting from this release condition, a clamping condition can be established by shifting the outer portion 80 in a clamping direction K onto the inner portion 82 such that the legs 24, 26 of the outer portions 80 encompass the legs 86, 88 of the inner portion 82. A ramp-type protrusion (not shown in detail) is provided here at the outer side of each of the legs 86, 88 of the inner portion 82 so that the legs 24, 26 of the outer portion 80 expand during this process. Due to this, a pressure force A is exerted by the legs 24, 26 in a direction toward the workpiece 14.

FIG. 9 shows the clamping condition in which the noses at the inner sides of the legs 24, 26 engage into another recess at the outer side of the legs 86, 88, whereby a second latching device 94 is formed. In the clamping condition, in other words, the outer portion 80 is latchingly locked to the inner portion 82 by means of the second latching device 94.

It is further shown in FIGS. 8 and 10 that the inner portion 82 may comprise side protrusions which form a shift-off protection in transversal direction. In other words, the shift-off protections 92 prevent that the outer portion 80 is shifted off from the inner portion 82 by parallel displacement.

It is further shown in FIG. 9 that the free ends of the legs 86, 88 of the inner portion 82 may comprise insertion chamfers 96 which facilitate the mounting to the workpiece 14. These insertion chamfers 96, in the clamping condition, are encompassed by the free ends of the legs 24, 26 of the outer portion 80 so that external forces cannot act upon the insertion chamfers 96.

In FIGS. 11 to 13, further embodiments of plastic clips 20 are described which generally correspond in terms of layout and function to the plastic clip of FIGS. 8 to 10. Similar elements are therefore depicted by identical reference numerals. Essentially the differences are explained in the following.

In FIGS. 11 and 12, a plastic clip 20 is shown wherein a plurality of latching noses 102 are provided at the outside of the legs 86, 88, which latching noses 102 are arranged one after another in the clamping direction K. Correspondingly, a plurality of latching noses is formed at the inner side of the legs 24, 26 of the outer portion 80, wherein the latching noses are arranged one after another in the clamping direction. The latching noses 102 are arranged along a cone line which encloses an angle 100 with the clamping direction K. Conclusively, the further the outer portion 80 is shifted onto the inner portion 82, the further are the legs 24, 26 spread open. In other words, the further the outer portion 80 is shifted onto the inner portion 82 the higher is the pressure force A which is achieved. This can serve to adjust the pressure force A or for matching to workpieces 14 of different thicknesses.

As is shown in FIG. 12, the latching noses can be arranged in a staggered fashion across the width of the outer portion 80 so as to achieve a finer grading of the latching noses 102.

A further embodiment is shown in FIG. 13, wherein the first latching device 90 and the second latching device 94 are characterized in that oblique latching surfaces are provided in contrast to latching surfaces which are aligned perpendicular to the clamping direction K. What may be achieved by adjusting the angles of these latching surfaces to different values is that the outer portion 80 can be shifted into the clamping position with relative low effort. On the other hand, what may also be achieved is that the outer portion 80 can be pulled off from the clamping position into the release position without the use of any tool, wherein the effort necessary to this purpose is higher than the effort for establishing the clamping condition. Corresponding latching surfaces for establishing the clamping condition are arranged under an angle β. A latching surface along which the outer portion 80 can be pulled off from the release position shown in FIG. 13, is shown at γ. An angle of a latching surface via which the outer portion 80 can be displaced from the clamping condition into the release condition is shown at α. The values of α and γ are preferably identical, but in any case have an amount larger than the angle β. The latching surface that needs to be overridden when pulling the outer portion 80 from the clamping position off the inner portion, is shown as pull-off chamfer 104 in FIG. 13, which is arranged at the angle α. The values of a and y are preferably smaller than 90° here.

A further embodiment of a plastic clip 20 is shown in FIG. 14, which includes an outer portion 80 and an inner portion 82. For the purpose of a simplified representation, only the right side of the clip 20 is shown. In the clip 20 of FIG. 14, an end of leg 26 of the outer portion 80 is connected via a parallelogram displacement portion 106 with an end of the associated leg 88 of the inner portion 82. In the release position, shown in continuous lines, the parallelogram displacement portion 106 is arranged at a relatively acute angle with respect to the clamping direction K. By moving the outer portion 80 in clamping direction K, an "erection" of the parallelogram displacement portion 106 is achieved, as is shown by interrupted lines at 106' in FIG. 14. Here, the distance between the leg 88 of the inner portion 82 and the associated leg 26' of the outer portion 80 is enlarged. Thereby, an increased pressure force A is exerted onto the inner portion 82 and the leg 88, so that an increased friction value is established. A latching device 94 for interlocking the inner portion 82 and the outer portion 80 in the clamping position, shown in interrupted lines, can, for example, be formed at an inner side of the outer base section 22 and an outer side of the inner base section 84, respectively, wherein such latching device 94 is shown schematically in FIG. 14.

Another embodiment of a plastic clip 20 is shown in FIG. 15. In FIG. 15, also, only one half of the plastic clip 20 is shown.

In this embodiment, the leg 88 of the inner portion 82 is pivotably connected by a pivot joint 108 (e.g. a ball joint) with an end of the associated leg 26 of the outer portion 80. A pivot axis 109 established thereby extends in parallel to a surface of the workpiece and approximately perpendicular to a mounting direction M along which the clip 20 is placed onto the workpiece 14. In the release position, shown in continuous lines in FIG. 15, the leg 88 of the inner portion 82 is pivoted, with respect to the leg 26 of the outer portion in such a way that a portion 111 at the inner side of the leg 88 lies against the surface of the workpiece 14. The sliding portion 111 is arranged adjacent to the pivot joint 108 and is not covered with an anti-slip section 36. In contrast, the anti-slip section is arranged at a free end of the leg 88 which faces the base section 22, and does not impede shifting the clip 40 onto the workpiece 14 in the release condition.

The clip 20 can be transferred from the release position as shown into a clamping condition by exerting a force transversal to the clamping direction onto a clamping arm 112 of the inner portion 82, wherein the clamping arm 112 is preferably arranged on the outer side of the leg 26 of the outer portion 80. The clamping arm 112 is thereby moved in a direction towards the leg 26 so that the free end of the leg 26 is moved outwardly away from the workpiece 14, as is shown at 110. Further, a second latching device 94 is established between an outer side of the leg 26 and the clamping arm 112 in order to fix the clamping condition. Due to the movement of the leg 26 away from the workpiece 14, the leg 88 of the inner portion 82 is aligned in parallel to the surface of the workpiece 14, so that the anti-slip section 36 comes into contact with this surface of the workpiece 14. This is shown in interrupted lines at 36' in FIG. 15. In addition, due to the spreading achieved thereby the leg 26 exerts a pressure force A onto the leg 88 in a direction toward the workpiece 14.

In each of the embodiments, the anti-slip section 36 can be formed as a two-dimensional plane section so that a two-dimensional contact with the surface of the workpiece 14 can be achieved overall. As an alternative, the corresponding surface of the anti-slip section 36 can be formed with a contour. This is shown by way of example at 105 in FIG. 13. What is achieved herewith (like a saw tooth profile) is that a smaller friction value and a smaller friction effect can be achieved in a direction of shifting onto the workpiece 14 than in the direction opposed thereto. Thereby, the pull-off force can be increased even more.

In each of the above-described embodiments, an anti-slip section made of a relatively soft plastic material is provided for increasing the friction force and the pull-off force. However, each of the above-described embodiments can be provided without such anti-slip section of a relatively soft plastic material. Here, rather than establishing a contact of the anti-slip section with the workpiece, an inner side of the leg of the plastic clip comes into contact with the workpiece (or the lever in the embodiment having a lever at a leg). As an alternative, it is possible to injection mould a metallic claw element into the plastic clip rather than providing an anti-slip section of the relatively soft plastic material, which metallic claw element provides an increased pull-off force in the clamping condition. In this case of a plastic clip with the claw element injection moulded therein, at least the step of pushing and mounting is facilitated and preferably does not lead to scratches at the surface of the workpiece or the like. Only in the clamping position, the claws of the claw element engage the workpiece.

It will be appreciated by persons skilled in the art that the above embodiments have been described by way of example only, and not in any limitative sense, and that various alterations and modifications are possible without departure from the scope of the invention as defined by the appended claims.

What is claimed is:

1. A plastic clip for fastening an article in the region of an end face of a flat workpiece, the clip comprising:
    an outer portion including a first base section and a first leg and a second leg, which extend from the first base section and form a U shape with the first base section, and the first leg and the second leg each include a respective first inner side and second inner side, the first inner side including a first latching nose projecting inward at a first distance from the first base section and a second latching nose projecting inward at a second distance from the first base section, the second distance greater than the first distance, and the first leg and the second leg are elastically movable relative to one another;
    an inner portion made of a relatively hard plastic material and including a second base section, a third leg and a fourth leg, an outer side of the third leg partially defining a first latching recess at a third distance from the second base section, and the third leg and the fourth leg each include a respective third inner side and a fourth inner side, and the inner portion partially defines a gripping space adapted to accommodate the end face of the workpiece, and the third leg and the fourth leg are elastically movable relative to one another in order to alter the gripping space;
    a first anti-slip section, made of a relatively soft plastic material, is arranged on an inner side of the third leg; and
    the inner portion is insertable into the outer portion.

2. The plastic clip according claim 1, wherein the outer portion is movable with respect to the inner portion in a clamping direction parallel to the legs so as to bring the plastic clip from a released condition, wherein the second latching nose engages the first latching recess, to a clamped condition, wherein the first latching nose engages the first latching recess, and in the clamped condition the outer portion exerts a pressure force on the inner portion in a compressing direction transverse to the clamping direction from the outside toward the workpiece.

3. The plastic clip according to claim 2, wherein the first latching nose includes a top surface and a bottom surface, the top surface closer to the first base section, and the bottom surface further from the first base section and sloping outward and downward in a direction away from the first base section.

4. The plastic clip according to claim 3, wherein the top surface of the first latching nose is an oblique latching surface sloping inward and downward in the direction away from the first base section.

5. The plastic clip according to claim 4, wherein the first latching recess is partially defined by an upper surface and a lower surface on the outer side of the third leg, the upper surface sloping inward and downward in a direction away from the second base section.

6. The plastic clip according to claim 3, wherein the clip defines a longitudinal axis extending through the head and down between the first leg and the second leg, and the top surface slopes inward and downward in the direction away from the first base section, such that an imaginary extension of the top surface defines with the longitudinal axis an upward opening acute first angle less than 90°.

7. The plastic clip according to claim 6, wherein an imaginary extension of the bottom surface defines with the longitudinal axis a downward opening acute second angle, and the second angle is smaller than the first angle.

8. The plastic clip according to claim 2, wherein the outer portion and the inner portion are coupled to each other by a coupling device before the plastic clip is brought into the clamped condition.

9. The plastic clip according to claim 2, wherein the outer portion and the inner portion are a unitary molded assembly coupled together by a frangible webbing which breaks when the plastic clip is first moved between the released condition and the clamped condition.

10. The plastic clip according to claim 1, wherein a damping section made of a relatively soft plastic material is formed on the fastening section and operable for fastening of the article.

11. The plastic clip according to claim 1, wherein at least one reinforcing rib extends radially outwards from an outer side of at least one of the first leg and the base section.

* * * * *